Nov. 9, 1965 R. N. TABER 3,217,247

SYSTEM FOR MEASUREMENT OF ATTENUATION TAKEN DIRECTLY IN DECIBELS AT RADIO FREQUENCIES UTILIZING LOGARITHMIC CIRCUITS

Filed Oct. 12, 1961 3 Sheets-Sheet 1

INVENTOR.
ROBERT N. TABER
BY Wade Koontz and George Fine
ATTORNEYS

INVENTOR.
ROBERT N. TABER
BY
ATTORNEYS

INVENTOR.
ROBERT N. TABER
BY Wade Koontz
and George Fine
ATTORNEYS

Nov. 9, 1965  R. N. TABER  3,217,247
SYSTEM FOR MEASUREMENT OF ATTENUATION TAKEN DIRECTLY IN
DECIBELS AT RADIO FREQUENCIES UTILIZING
LOGARITHMIC CIRCUITS
Filed Oct. 12, 1961  3 Sheets-Sheet 3

INVENTOR.
BY
ATTORNEYS

United States Patent Office 3,217,247
Patented Nov. 9, 1965

3,217,247

SYSTEM FOR MEASUREMENT OF ATTENUATION TAKEN DIRECTLY IN DECIBELS AT RADIO FREQUENCIES UTILIZING LOGARITHMIC CIRCUITS

Robert N. Taber, Belmont, Mass., assignor to the United States of America as represented by the Secretary of the Air Force Filed Oct. 12, 1961, Ser. No. 144,805
4 Claims. (Cl. 324—57)

This invention relates to a method and system for measuring radiant energy attenuation and more particularly to a method and system for precision measurement of attenuation at radio frequencies by utilizing a comparison technique.

In accordance with the present invention, there is provided precision measurement of attenuation at radio frequencies by a comparison technique. With this method and system, readings are taken directly in decibels. A comparison technique usually infers that a complete set of standards must be available to be compared against. This technique requires only one standard for each 12 db range where measurements are to be taken. As the radio frequency signals are operated on by a linear to log conversion before comparison the difference between the standard and the attenuator to be measured appears in the output as a linear function of db. This eliminates the requirement for an extremely stable source of radio frequency. Accuracies of better than 2% of the reading are obtained where the difference between the standard and the attenuator under test is 6 db or less.

The system of the present invention is comprised of a radio frequency pulse source which supplies a testing signal to a power divider. Each of two equal outputs of the power divider is respectively applied to an attenuator under test and a standard calibrated attenuator. The attenuated signals from the two attenuators are each applied to an associated logarithmic circuit. The logarithmic circuit detects each signal applied thereto and converts the detected linear signal to a logarithmic signal. The difference between these logarithmic signals is computed in a difference amplifier and applied to an indicator. Since the signals taken from the aforementioned attenuators are converted to logarithmic form before the difference is computed, this difference between outputs from the standard and test attenuators appears in the output as a function of decibels.

An object of the present invention is to provide a method and system of attenuation measurement at radio frequencies by a comparison technique.

Another object of the present invention is to provide a method and system of attenuation measurement at radio frequencies by a comparison technique wherein the radio frequency signals are operated on by a linear to logarithmic conversion before comparison.

Still another object of the present invention is to provide a method and system for measuring attenuation of a radio frequency signal wherein aforesaid radio frequency signal is equally divided to obtain linear reference and test signals, each of which are thereupon converted to logarithmic form for subsequent comparison to each other.

Still further objects and advantages of the present invention will appear from the more detailed description set forth below, it being understood, however, that such detailed description is given by way of illustration and explanation only, and not by way of limitation, since various changes therein may be made by those skilled in the art without departing from the scope and spirit of the present invention.

In connection wtih the more detailed description, there is shown the accompanying drawings in which.

Figure 1:
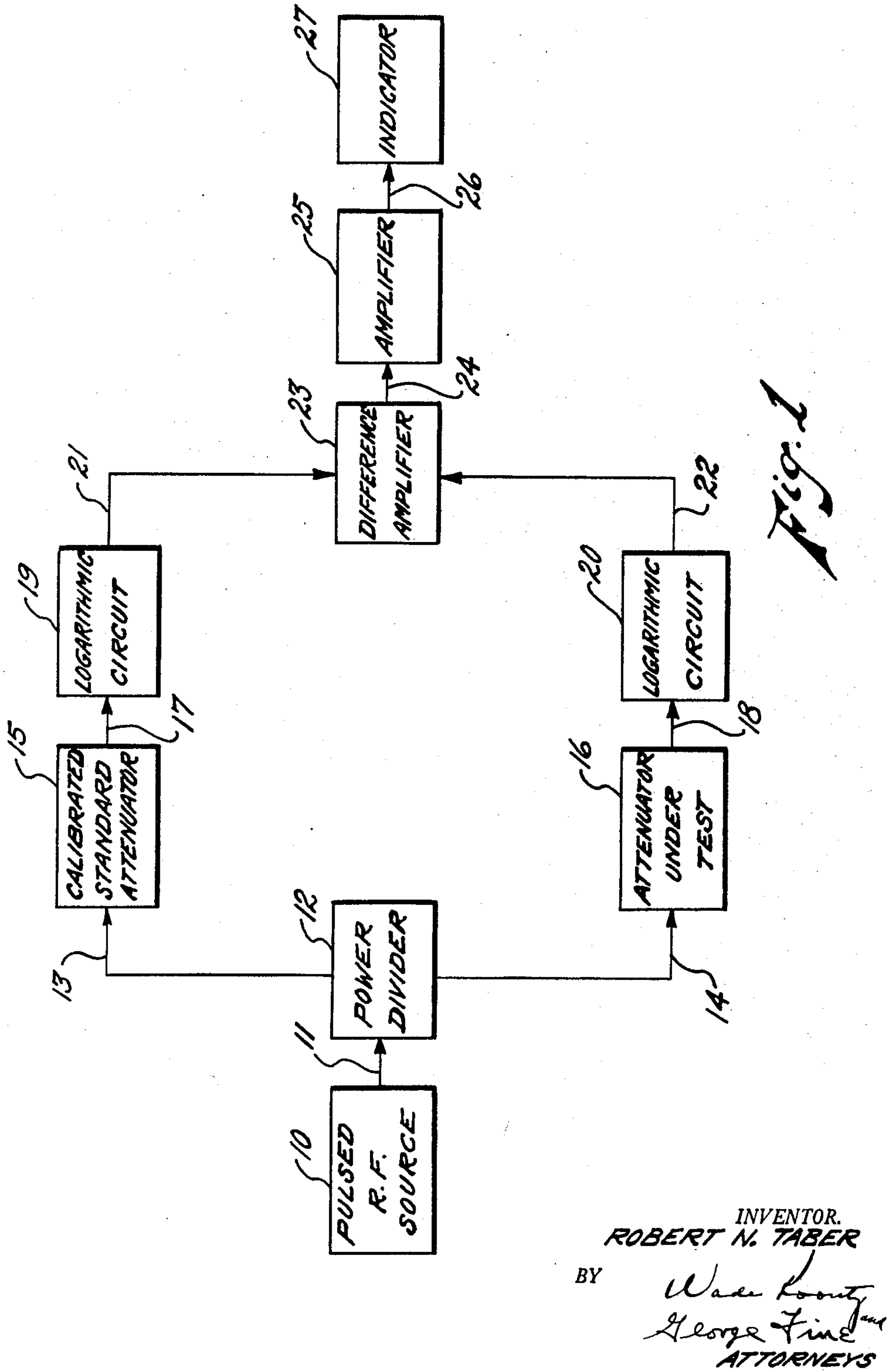
FIGURE 1 is a block diagram of the preferred embodiment of the present system for the measurement of attenuation of a radio frequency signal.

Now referring in detail to FIGURE 1, there is shown pulsed radio frequency source 10 which supplies approximately 300 microsecond pulses of the desired radio frequency at a sixty cycle or lower repetition rate to power divider 12 by way of line 11. Power divider 12 is conventional and may be of the type shown and described at pages 516–528 of volume 9 of the Radiation Laboratory Series published in 1948 by McGraw-Hill Book Company, Inc.

Two equal output signals are provided by power divider 12, one of which is fed by way of line 13 to calibrated standard attenuator 15, and the other of which is fed by way of line 14 to test attenuator 16. The output signals fed to attenuators 15 and 16 are hereinafter referred to as the reference and signal inputs, respectively. The attenuation of calibrated standard attenuator 15 should be within 6 db of test attenuator 16.

The attenuated signal from calibrated standard attenuator 15 is fed by way of line 17 to logarithmic circuit 19 and the attenuated signal from test attenuator 16 is fed by way of line 18 to logarithmic circuit 20. Each of logarithmic circuits 19 and 20 detects the signal input thereto and converts the detected (linear) signal to a logarithmic signal. The output of logarithmic circuit 19 is fed by way of line 21 to difference amplifier 23 and the output of logarithmic circuit 20 is fed by way of line 22 to difference amplifier 23. The difference between the aforesaid logarithmic signals is computed in difference amplifier 23 and the difference signal is then applied by way of line 24, amplifier 25 and line 26 to indicator 27. Since the signals taken from the attenuators are converted to logarithmic form before the difference is computed, this difference between the outputs from the calibrated standard attenuator and the attenuator under test appears in the system output as a function of decibels. It is to be noted that with radio frequence pulse source 10 adjusted so that both the reference and signals inputs to attenuators 15 and 16, respectively, are within the levels 4 to 10 dbm, the difference between the two attenuators can be read directly on indicator 27. Indicator 27 may be a meter that is calibrated to provide db readings.

Figure 2:
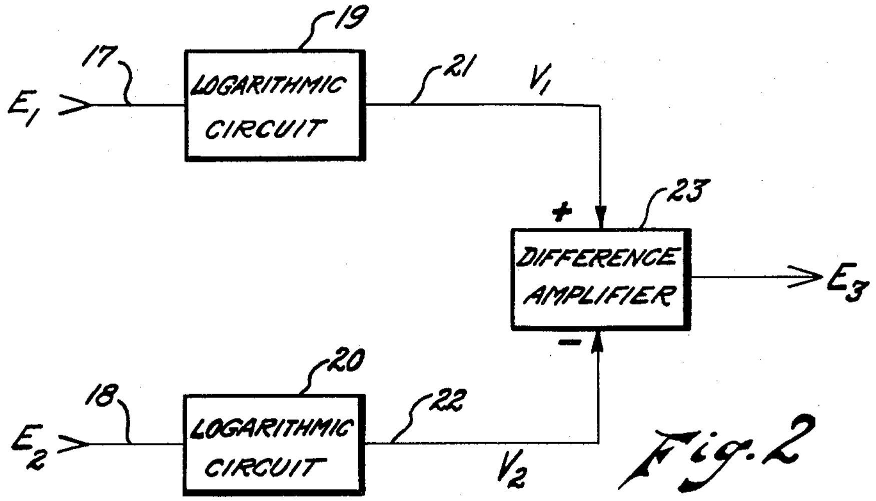
FIGURE 2 shows in block diagram form the comparator circuit of the system illustrated in FIGURE 1.

Now referring to FIGURE 2, there is shown the comparator circuit of the present invention which is one of the major features of the present invention and provides the ability to solve the following non-linear equation:

$$E_{out}=K(E_{1db}-E_{2db})$$

(1) Let $V_1=K_1 \ln E_1 \quad V_2=K_1 \ln E_2$ (2) $E_3=K_3(V_1-V_2)$ (3)=(2)+(1) $E_3=K_1K_3 (\ln E_1-\ln E_2)$ Express $E_1$ and $E_2$ in db.

(4) $E_{1db}=K_2 \ln E_1 \quad E_{2db}=K_2 \ln E_2$ (5) $E_1=e^{\frac{E_{1db}}{K_2}} \quad E_2=e^{\frac{E_{2db}}{K_2}}$ (6)=(5)+(3)

$$E_3=K_1K_3\left(\ln e^{\frac{E_{1db}}{K_2}}-\ln e^{\frac{E_{2db}}{K_2}}\right)$$

(7) $E_3=\frac{K_1K_3}{K_2}(E_{1db}-E_{2db})$

In these expressions:

$K$, $K_1$, $K_2$, and $K_3$ are constants;
$E_1$ and $E_2$ are the inputs to logarithmic circuits 19 and 20, respectively;
$E_3$ is the output of difference amplifier 23;
$V_1$ and $V_2$ are the outputs of logarithmic circuits 19 and 20, respectively.

It should be noted that on the above derivation natural logs are used. This is in no way a restriction on the log circuits shown in the block diagram. Since a change of base can be accomplished by multiplying by a constant, and since each application of logs in the derivation is preceded by a constant, the derivation is perfectly general.

To construct the comparator circuit, it is necessary to have two very similar circuits. Their transfer function must allow the output to be some constant times the log to any base of the input voltage divided by a constant. These two circuits are combined with a difference amplifier as shown in FIGURE 2 to solve the required equation.

Figure 4:
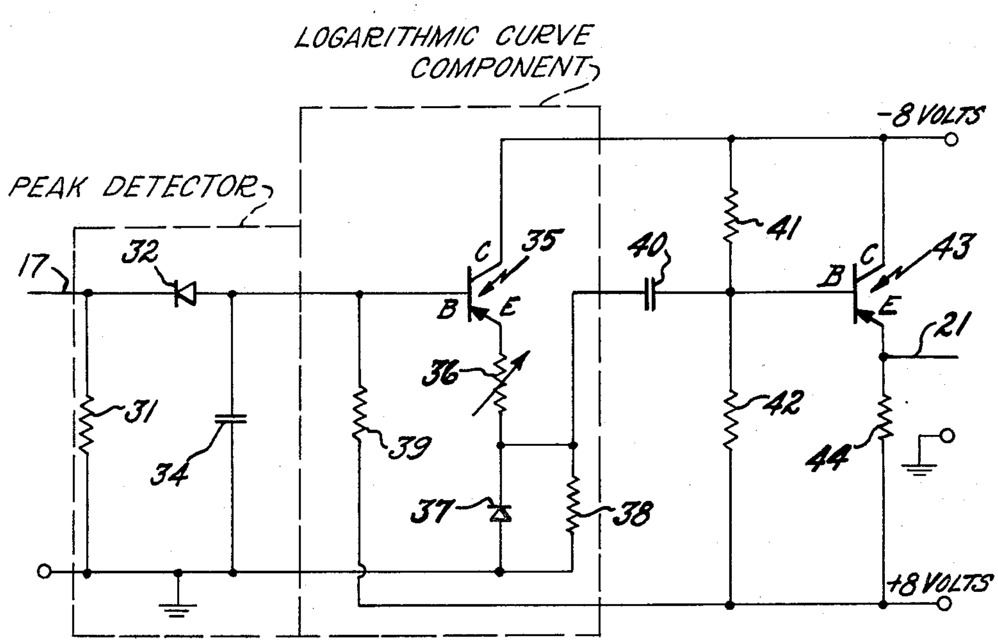
FIGURE 4 shows a schematic diagram of the logarithmic circuit that is incorporated in the comparator shown in FIGURE 2.
Figure 5:
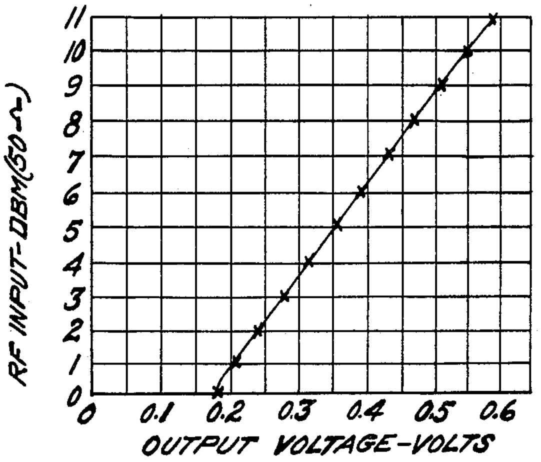
FIGURE 5 illustrates the input-output curve for the logarithmic circuit shown in FIGURE 4 and shows the transfer characteristics thereof.
Figure 3:
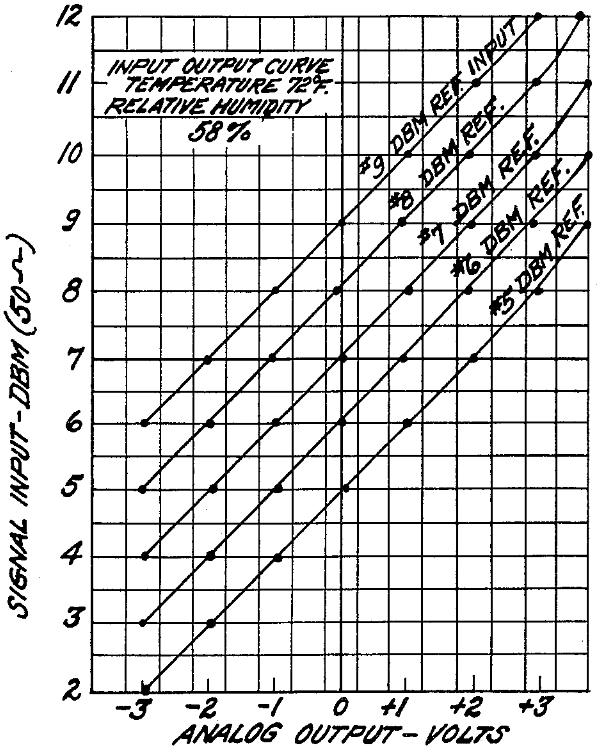
FIGURE 3 illustrates the input-output curves for the comparator circuit shown in FIGURE 2 and shows the operating characteristics thereof.

Now referring to FIGURE 4, there is shown a schematic diagram which is representative of each of logarithmic circuits 19 and 20. This circuit operates with a pulsed radio frequency input. The operation of the logarithmic circuit is as follows. The aforesaid radio frequency pulses are fed into the logarithmic circuit by way of line 17. Resistor 31, diode 32, and capacitor 34, are a peak detector circuit and serve to detect the linear radio frequency input pulses which are in turn fed to the base of transistor 35. Transistor 35 with the components in the emitter circuit thereof form the logarithmic curve. The aforesaid components are comprised of potentiometer 36 and diode 37. The curve in FIGURE 5 shows the transfer characteristics of the complete circuit. This curve has non-linearities at each extreme of the desired operating range. The low level part of the curve can be shifted right or left by selecting the appropriate diode 37. Potentiometer 36 in the emitter circuit is used to adjust the upper right of the curve. The curve is shifted upward with increasing resistance. Resistor 38 positioned across diode 37 in the emitter circuit of transistor 35 limits the impedance at this point. As diode 37 is cut-off between pulses, the impedance at this point would be that of the back resistance of diode 37 in parallel with the impedance looking into the emitter of the cut-off transistor 35. This impedance is not stable and without resistor 38, the changes in this level will cause a change in the output pulse amplitude. The base of transistor 35 is a sensitive point. Resistor 39 from +8 volts to the base prevents the voltage at this point from drifting towards −8 volts. The output from the emitter circuit of transistor 35 is fed to the base of transistor 43 by way of capacitor 40. Transistor 43 and the associated components thereof including resistors 41, 42 and 44 provide a second stage to the logarithmic circuit. Due to the non-linear impedance looking from the base of second stage transistor 43 looking into the emitter circuit of transistor 35, the circuit is inherently repetition rate sensitive. The second stage is an emitter follower used to isolate the load from this non-linear source. The output from transistor 43 is by way of line 21.

Having thus set forth my invention, I claim:

1. A system for precision measurement of attenuation of radio frequency signals comprising a source of radio frequency pulses, means to equally divide said pulses for reference and signal inputs respectively, a first calibrated standard attenuator receiving said reference input, a second attenuator under test, said second attenuator receiving said signal input, a first logarithmic circuit receiving the output signal from said first attenuator, a second logarithmic circuit receiving the output signal from said second attenuator, both of said logarithmic circuits first operating to linearly detect the input signal thereto and subsequently converting the linear detected signal to logarithmic form, each of said logarithmic circuits having a transfer function permitting the output signal therefrom to be a constant times the log to any base of said voltage received thereby divided by said constant, means to compare the output signal from said first logarithmic circuit to the output signal of said second logarithmic circuit to obtain a decibel difference signal therebetween, and means to indicate said decibel difference signal on a meter calibrated to provide decibel readings.

2. A system for precision measurement of attenuation of radio frequency pulses as set forth in claim 1 wherein each of said logarithmic circuits is comprised of a peak detector receiving said attenuated signals, said peak detector consisting of a diode with a resistor to ground at the input and a capacitor to ground at the output thereof, a first transistor having a base, collector, and emitter, said base receiving said detected pulses, said emitter being connected to ground by a potentiometer and a diode in series therebetween and operating to form a logarithmic curve wherein said diode controls the lower level of said curve and said potentiometer adjusts the upper level of said curve, said diode having positioned thereacross a first fixed resistor, said collector being connected to a negative source of voltage and said base being connected to a positive source of voltage by way of a second fixed resistor.

3. A system for precision measurement of attenuation of radio frequency pulses comprising a source of said radio frequency pulses, means to equally divide said pulses for reference and signal inputs respectively, a first calibrated standard attenuator receiving said reference input, a second attenuator under test, said second attenuator receiving said signal input, a first peak detector receiving the output signal from said first attenuator to provide a first linear pulse signal, a second peak detector receiving the output signal from said second attenuator to provide a second linear pulse signal, first, and second logarithmic circuits receiving said first and second linear signals, respectively, each of said logarithmic circuits having a transfer function permitting the output signal therefrom to be a constant times the log to any base of said linear signal divided by said constant, a difference amplifier receiving each of the output signals as inputs from said first and second logarithmic circuits, and operating to provide an output signal being the difference in decibels of said two inputs signals thereto, and a meter calibrated in decibels connected to the output of said difference amplifier to provide a reading being the difference in decibels between said first and second attenuator.

4. A system for precision measurement of radio frequency pulses as set forth in claim 3 wherein each of said logarithmic circuits is comprised of a first transistor circuit having a base, collector, and emitter, said base receiving said linear signal, said emitter being connected to ground by a potentiometer and a diode in series therebetween and operating to form a logarithmic curve, said potentiometer adjusting the upper part of said logarithmic curve and said diode controlling the lower part of said logarithmic curve, said diode also being cut off between said linear pulses, said collector being connected to a negative source of voltage and said base being connected to a positive source of voltage, a resistor connected across said diode to stabilize the output pulse amplitude, and a second transistor circuit being an emitter follower and connected to the output of said first transistor circuit.

References Cited by the Examiner

UNITED STATES PATENTS

| | | | |
|---|---|---|---|
| 1,684,397 | 9/28 | Hubbard | 324—57 |
| 1,684,403 | 9/28 | Mason | 324—57 X |

| | | | |
|---|---|---|---|
| 2,576,249 | 11/51 | Barney. | |
| 2,769,098 | 10/56 | Dunham. | |
| 2,783,453 | 2/57 | Rose | 328—146 X |
| 2,889,467 | 6/59 | Endres | 307—88.5 |
| 3,089,968 | 5/63 | Dunn | 328—145 X |
| 3,108,224 | 10/63 | Bradsell | 328—145 X |

FOREIGN PATENTS

| | | |
|---|---|---|
| 217,898 | 10/58 | Australia. |

OTHER REFERENCES

Schaeffer, N. M., and Wood, G. W.: "The Application of Some Semiconductors as Logarithmic Elements," IRE, volume 42, No. 7, July 1954, pages 1113–1116.

WALTER L. CARLSON, *Primary Examiner.*